F. J. COLE & F. F. SCOVILLE.
LOCOMOTIVE TRAILING TRUCK.
APPLICATION FILED MAY 6, 1915.
1,143,943.
Patented June 22, 1915
7 SHEETS—SHEET 7.
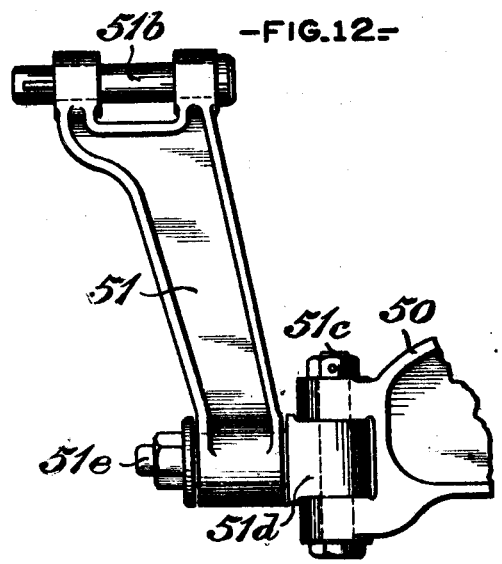
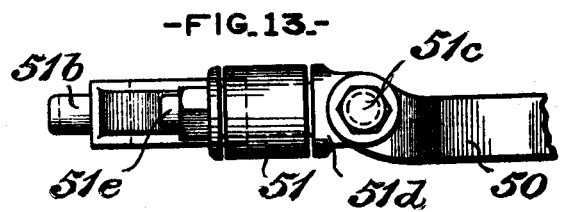
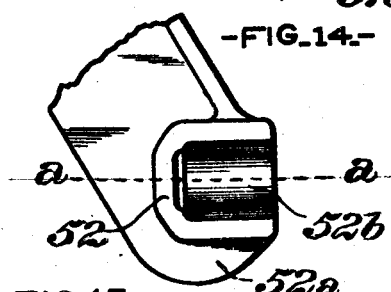
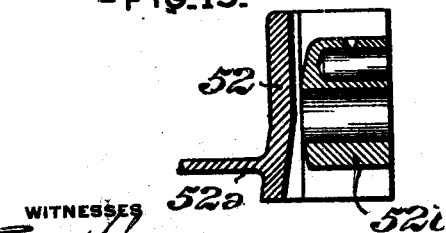
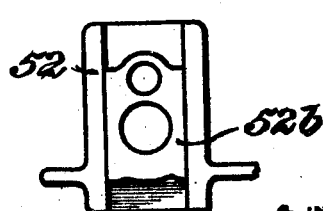

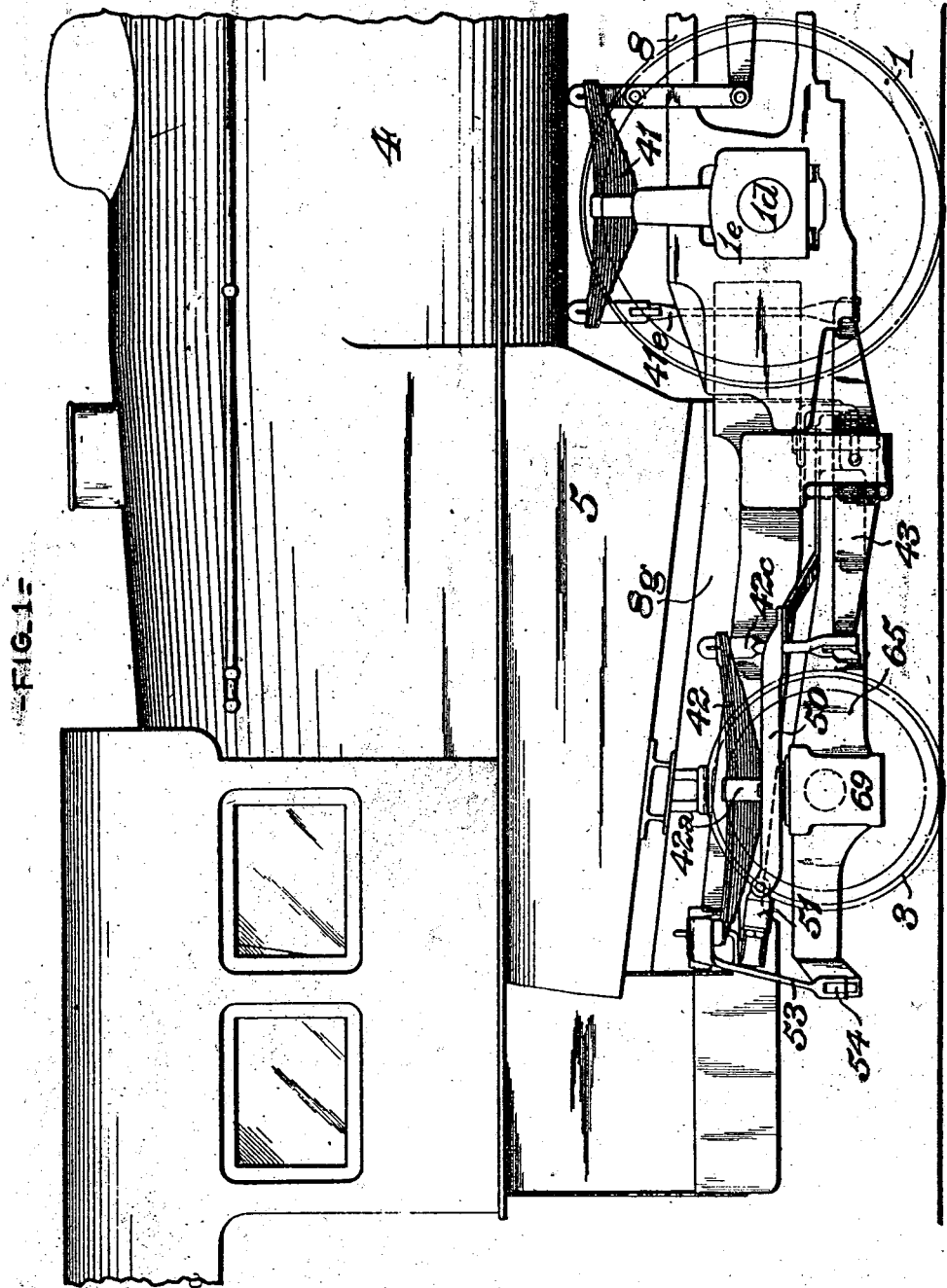

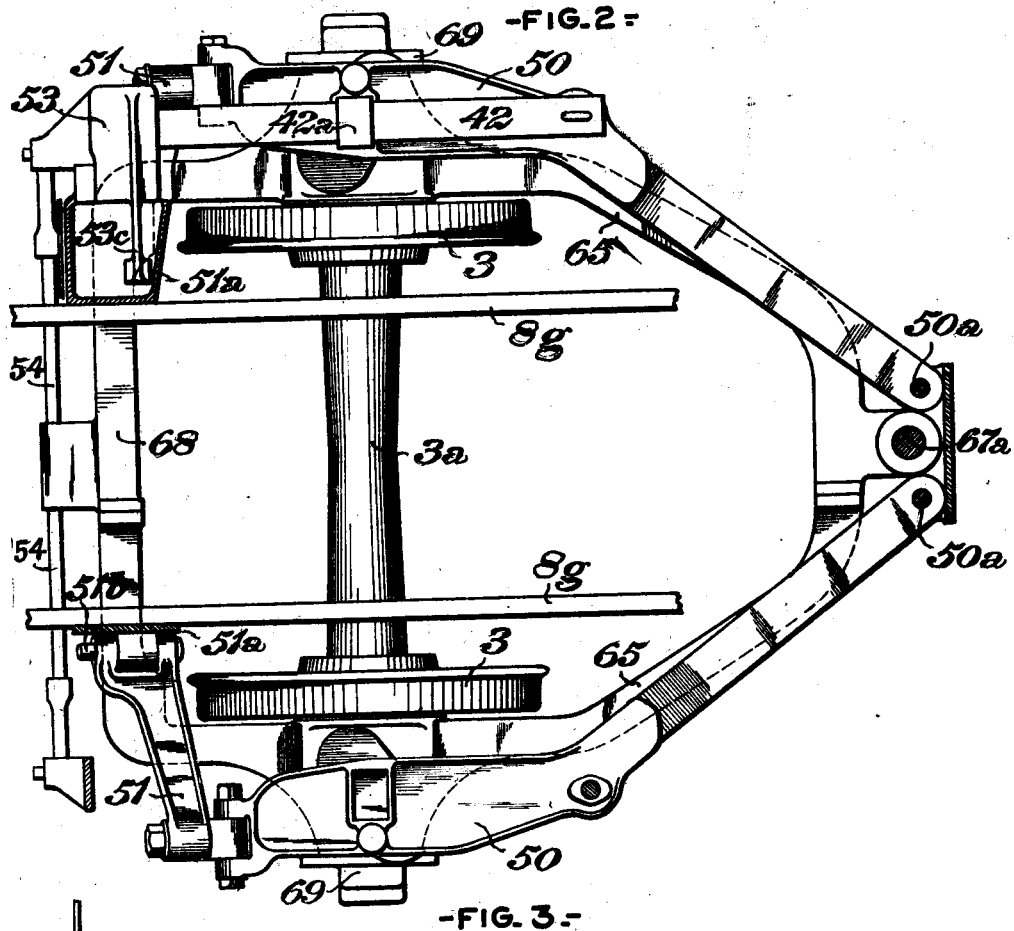

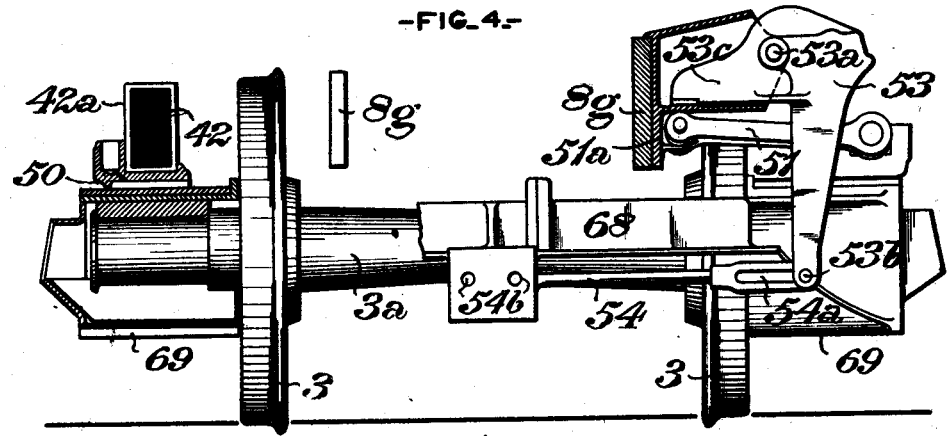
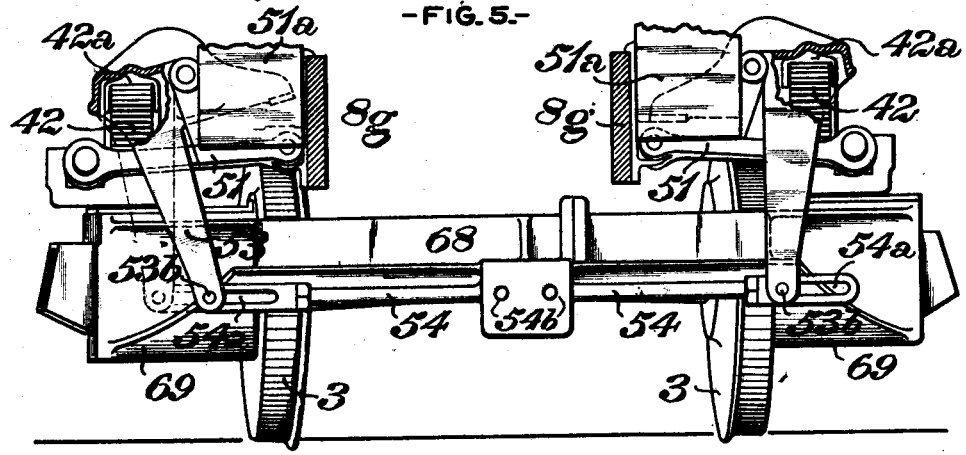
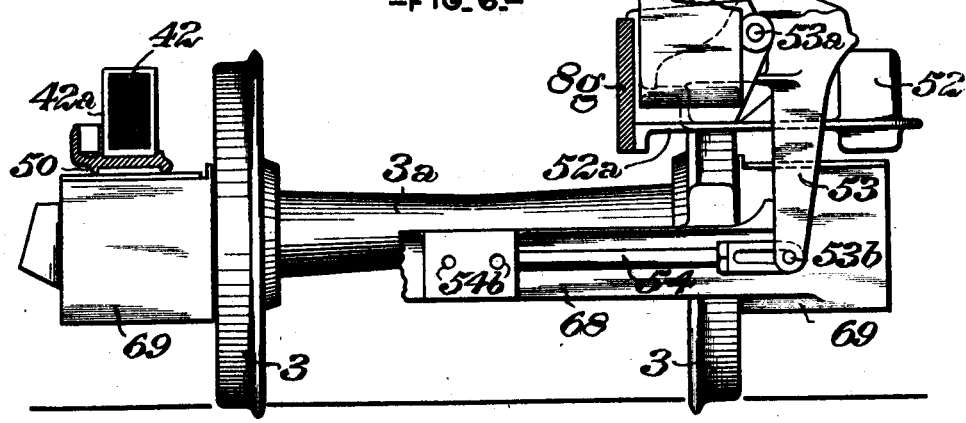

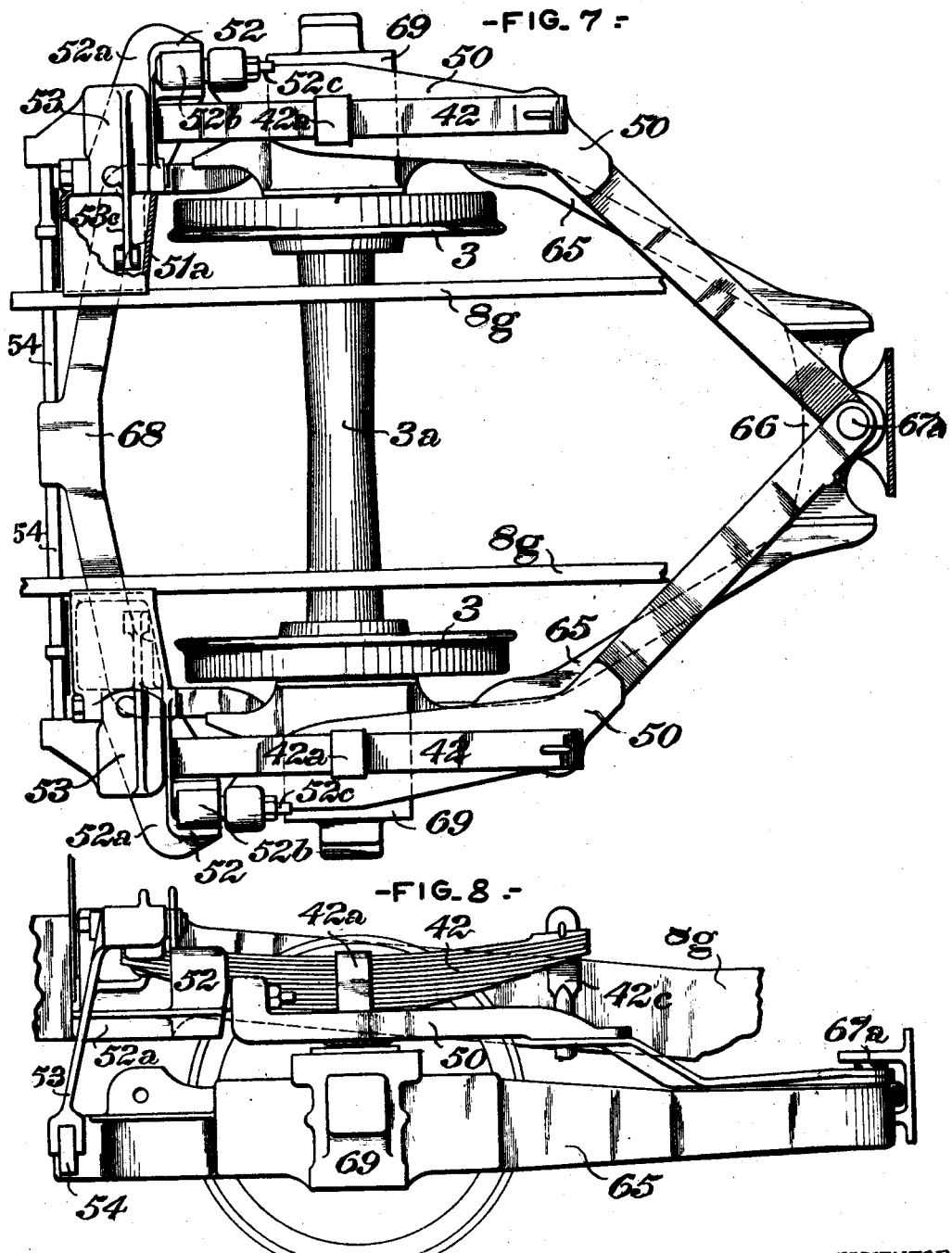

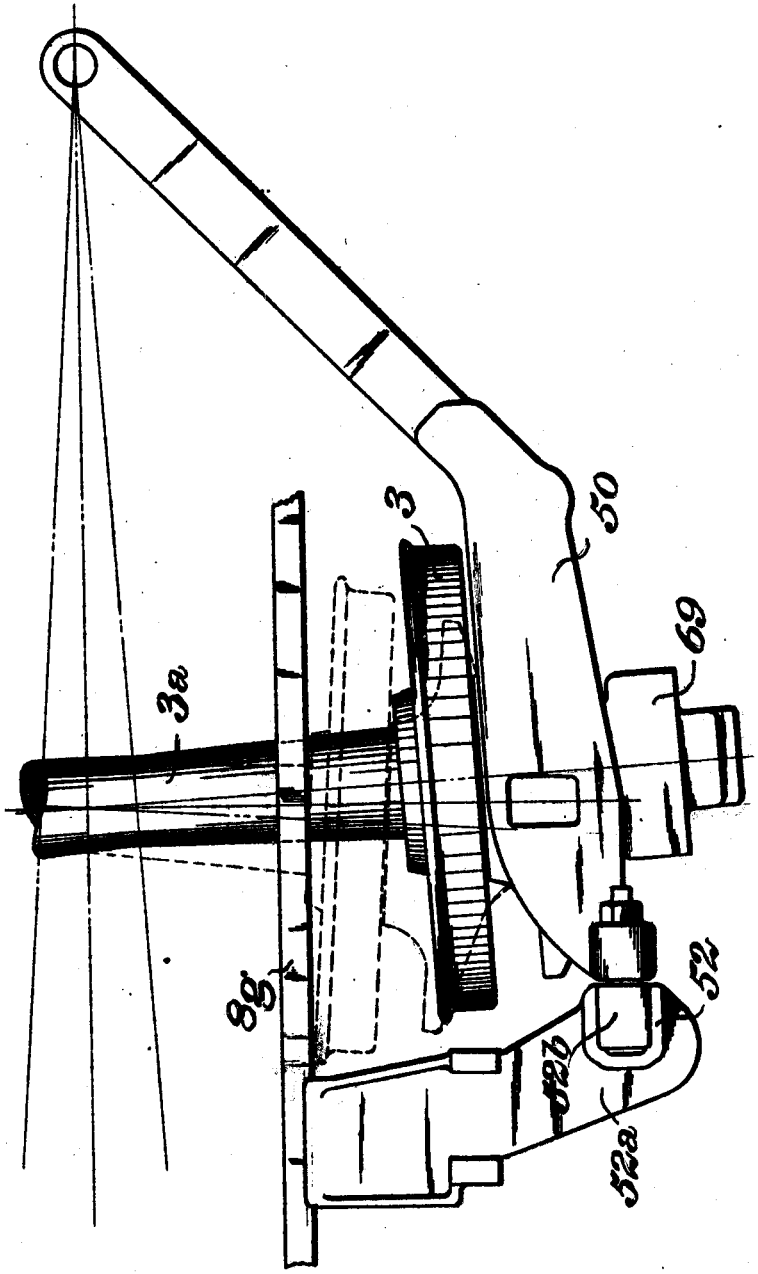

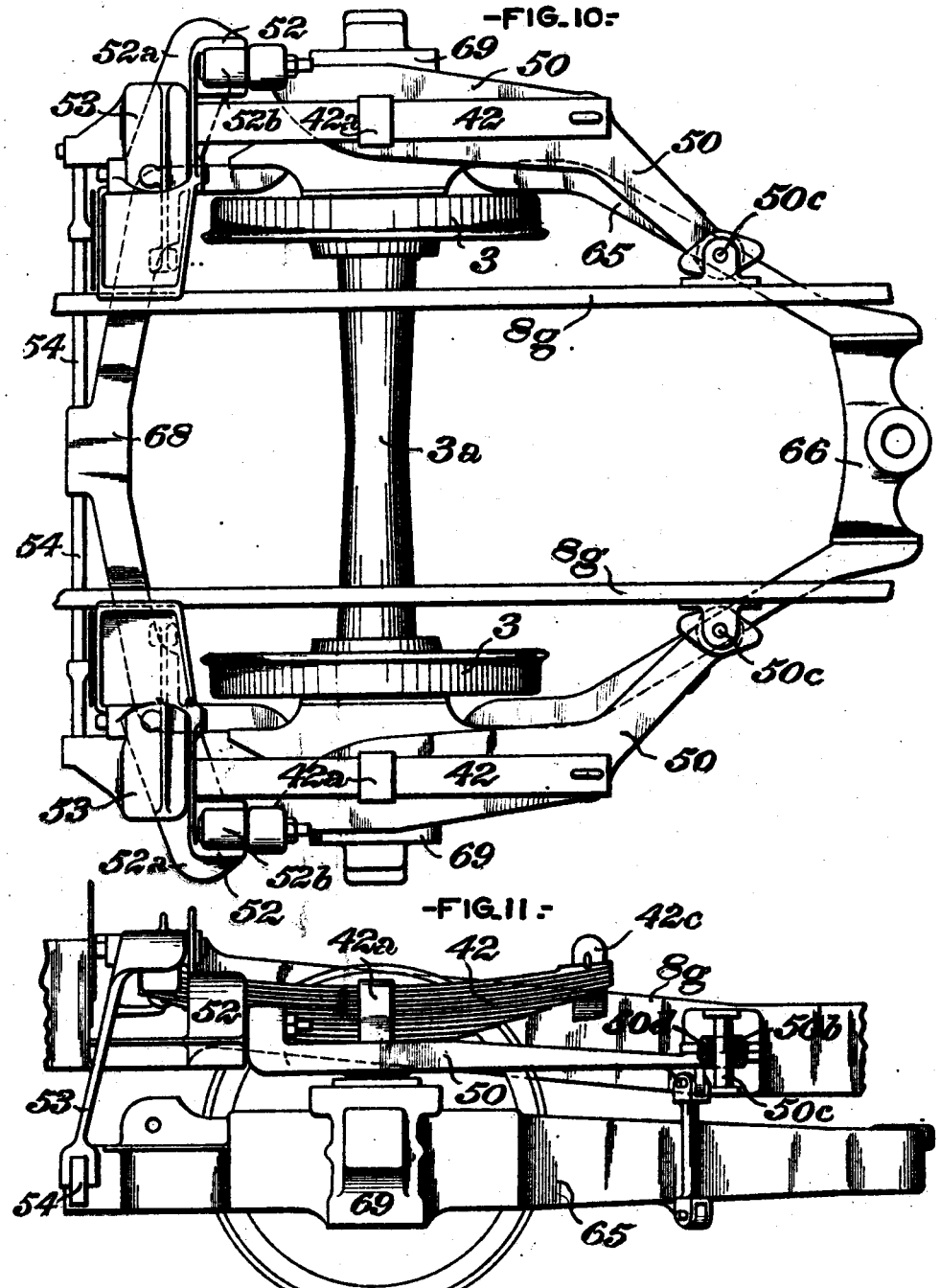

UNITED STATES PATENT OFFICE.

FRANCIS J. COLE AND FRANK F. SCOVILLE, OF SCHENECTADY, NEW YORK.

LOCOMOTIVE TRAILING TRUCK.

1,143,943.     Specification of Letters Patent.     Patented June 22, 1915.

Application filed May 6, 1915. Serial No. 26,245.

*To all whom it may concern:*

Be it known that we, FRANCIS J. COLE and FRANK F. SCOVILLE, both of Schenectady, in the county of Schenectady and State of New York, have jointly invented a certain new and useful Improvement in Locomotive Trailing Trucks, of which improvement the following is a specification.

Our invention relates to locomotive trailing trucks of the general class or type set forth in our Letters Patent of the United States Nos. 773,713 and 936,413, granted and issued under dates of November 1, 1904, and October 12, 1909, respectively, and its object is to simplify and improve the construction of the centering mechanism and yoke and their relation to other members, whereby inspection and maintenance shall be facilitated, the parallelism of the carrying springs with the boxes be assured, and greater clearance be permitted between the springs and the ash pan or the bottom of the mud ring of the firebox.

The improvement claimed is hereinafter fully set forth.

In the accompanying drawings: Figure 1 is a side view, in elevation, of the rear portion of a locomotive engine, illustrating the application of a trailing truck embodying our invention; Fig. 2, a plan view, on an enlarged scale, of the truck; Fig. 3, a side view thereof; Fig. 4, a transverse section, taken partly in the plane of the truck axle and partly in the rear of the truck, which is shown in middle or normal position; Fig. 5, a rear view of the truck, when swung laterally relatively to the main frame of the locomotive; Fig. 6, a view, taken similarly to Fig. 4, but showing a structural modification; Fig. 7, a plan view of the truck shown in Fig. 6; Fig. 8, a side view thereof; Fig. 9, a half plan view, showing the truck swung laterally; Fig. 10, a plan view of a truck showing another structural modification; Fig. 11, a side view of the same; Fig. 12, a plan view, on an enlarged scale, of one of the coupling links, and a portion of a yoke, of the truck shown in Figs. 1 to 5 inclusive; Fig. 13, a side view thereof; Fig. 14, a plan view of one of the vertical guides of the trucks shown in Figs. 6 to 11 inclusive; Fig. 15, a vertical section through the same, on the line $a\,a$ of Fig. 14; and, Fig. 16, a front or face view of the same.

Our invention is, as in Letters Patent Nos. 773,713 and 936,413 aforesaid, herein illustrated as applied in a locomotive engine having a plurality of pairs of driving wheels, 1, only the rear pair of which is shown, and having its boiler, 4, provided with a wide firebox, 5, which is overhung or set behind the rear driving wheels. The driving wheels are fixed upon axles, $1^d$, the journals of which rotate in boxes, $1^e$, fitted in pedestals in the main frame members, 8, and the overhanging weight of the firebox is carried on a radial trailing truck, the construction of which will now be described.

The frame of the truck, which is of the two wheeled radial type, is substantially triangular in plan, and is made up of two forwardly and inwardly inclined radius arms, 65, which may be connected, at their forward ends, either directly or by a front connecting plate, 66, a socket for a center pin, $67^a$, being in either case provided; and a transverse rear member, 68. Journal boxes, 69, are located at proper points in the length of the radius arms, and, in this instance, are shown as formed integral therewith.

The truck axle, $3^a$, on which the truck wheels, 3, are secured, extends outwardly beyond its wheel seats, sufficiently far to provide outside journals, which rotate in journal bearings fitted in the journal boxes, 69, in the usual manner. The rear members, $8^g$, of the main frame of the locomotive, are supported upon the truck axle, through the intermediation of springs, 42, the bands, $42^a$, of which are seated upon the tops of frictional yoke members, 50, which are, in turn, seated on the tops of the journal boxes, 69, and will be presently described. The rear ends of the truck springs are connected to the rear main frame sections, $8^g$, and their forward ends are connected, by spring hangers, $42^c$, to the rear ends of equalizers, 43, pivoted in supports, 44, depending from the main frame members, $8^g$. The forward ends of the equalizers are connected to the rear spring hangers, $41^e$, of the springs, 41, of the driving axle, $1^d$, nearest the firebox.

The frictional yoke members, 50, on which the truck springs are, as before stated, seated, are in the form of horizontally disposed plates, which may be either integral throughout their length, as shown in Figs. 10 and 11, or, for convenience of construction, be composed of two connected sections, as shown in other figures. The tops of the yokes are suitably recessed to receive the spring bands, 42ª, and the yokes bear, on their under sides, directly on the tops of the journal boxes, 69. As shown in Figs. 1 to 5 inclusive, and Figs. 12 and 13, the rear ends of the yokes are coupled, by substantially horizontal links, 51, to the main frame members, 8ᵍ, the connections being made through brackets, 51ª, secured to the frame members, to which the links, 51, are pivoted by pins, 51ᵇ, and the links and yokes are connected by universal joints, consisting of pins, 51ᶜ, fitting in the yokes and pivoted in sockets, 51ᵈ, on the ends of pins, 51ᵉ, journaled in the adjoining ends of the links.

Figs. 6 to 11 inclusive, and Figs. 14, 15 and 16, illustrate a structural modification, in which the rear ends of the yokes are connected to the main frame members through rigid vertical guides, 52, which are cast integral with, or suitably secured to, plate arms, 52ª, projecting laterally from, and secured at their inner ends to, the main frame members, 8ᵍ. The yokes, 50, are fitted with trunnions, 52ᶜ, which are journaled in blocks, 52ᵇ, fitted to slide vertically in the guides, 52.

In the constructions shown in Figs. 1 to 3 inclusive, the forward ends of the yokes, 50, are shown as coupled to the truck frame by pins, 50ª, located on opposite sides of, and adjacent to, the center pin, 67ª, of the truck, and in Figs. 7 to 9 inclusive, they are shown as coupled directly to the pin, 67ª. In the structural modification illustrated in Figs. 10 and 11, they are connected to the main frame members by universal joints, located in rear of the center pin and comprising ball members, 50ᵇ, fitted on vertical pins, 50ᶜ, secured to the frame members, 8ᵍ, and inclosed in correspondingly recessed sockets, 50ᵈ, on the front ends of the yokes.

The lateral movements of the truck are controlled and limited, and the truck normally maintained with its longitudinal central plane in coincidence with that of the locomotive, by the friction of the yokes on the tops of the journal boxes, augmented by pressure exerted on the tops of the springs, in and by the swiveling movements of the truck, through a lever and link system of the following construction. A bell crank or elbow rocking lever, 53, is pivoted by a pin, 53ª, to each of the lateral brackets, 51ª, of the main frame members, 8ᵍ, and carries, on its lower end, a pin, 53ᵇ, which traverses in a longitudinal slot, 54ª, adjoining the outer end of a link, 54, the inner end of which is coupled, by a pin, 54ᵇ, to the rear member, 68, of the truck frame. The upper arms of the levers, 53, are recessed to fit over the truck springs, 42, and the levers are also provided with inwardly extending arms, 53ᶜ, which normally abut on bearings on the supporting brackets, 51ᵉ. As shown in Fig. 5, when the truck swings in either direction, the lever, 53, which is on what may be termed the "following" side of the truck frame, that is to say, the side which is moving inwardly, is drawn inwardly by its link, thereby exerting downward pressure, through its application on the adjacent truck spring. The opposite lever is not moved, as the slot of its link traverses freely over its lower pin, 53ᵇ. The increased frictional resistance imparted to the yoke adjacent to the lever which has been moved, by the pressure on the spring, promotes the easy riding of the truck and prevents excessive lateral oscillations, and acts to return the truck to normal central position when passing from a curve to a tangent of the track.

It will be seen that the construction of the truck is materially simplified and economized by the elimination of the centering spring mechanism and the pivoted yokes of Patents Nos. 773,713 and 936,413 aforesaid, and that a further advantage is attained by the provision of frictional devices which always remain parallel with the journal boxes, and by the ability of lowering the truck springs, which can be done to the extent of about five inches, with consequent correspondingly increased clearance between the springs and the ash pan.

We claim as our invention and desire to secure by Letters Patent:

1. In a locomotive engine, the combination of a main frame, driving wheels journaled in bearings therein, a radial truck pivoted to the main frame, springs through which weight borne by the main frame is transmitted to the frame of the truck, and frictional members interposed between said springs and the frame of the truck, and connected, at their opposite ends, to said frame and to the main frame.

2. In a locomotive engine, the combination of a main frame, driving wheels journaled in bearings therein, a radial truck pivoted to the main frame, springs through which weight borne by the main frame is transmitted to the frame of the truck, frictional members interposed between said springs and the frame of the truck, and pivotal connections coupling said frictional members, at their opposite ends, to said frame and to the main frame.

3. In a locomotive engine, the combination of a main frame, driving wheels journaled in bearings therein, a radial truck pivoted to the main frame, springs through which weight borne by the main frame is transmitted to the frame of the truck, frictional members interposed between said springs and the frame of the truck, links pivotally connected to the rear ends of said frictional members and to the main frame, and pivotal connections coupling the front ends of said frictional members to the frame of the truck.

4. In a locomotive engine, the combination of a main frame, driving wheels journaled in bearings therein, a radial truck pivoted to the main frame, springs through which weight borne by the main frame is transmitted to the frame of the truck, frictional members interposed between said springs and the frame of the truck, universal joint pivotal connections coupling the rear ends of said frictional members to the main frame, and pivotal connections coupling the front ends of said frictional members to the frame of the truck.

5. In a locomotive engine, the combination of a main frame, driving wheels journaled in bearings therein, a radial truck pivoted to the main frame, springs through which weight borne by the main frame is transmitted to the frame of the truck, journal boxes fixed in said frame, frictional members bearing on said journal boxes and forming seats for said springs, and pivotal connections coupling said frictional members, at their opposite ends, to the main and to the truck frame, respectively.

6. In a locomotive engine, the combination of a main frame, driving wheels journaled in bearings therein, a radial truck pivoted to the main frame, springs through which weight borne by the main frame is transmitted to the frame of the truck, frictional members interposed between said springs and the frame of the truck, and means connecting said frictional members to the main frame with the capacity of relative vertical movement and prevention of relative lateral movement.

7. In a locomotive engine, the combination of a main frame, driving wheels journaled in bearings therein, a radial truck pivoted to the main frame, springs through which weight borne by the main frame is transmitted to the frame of the truck, and means, connected to the main frame, for exerting downward pressure on the truck springs in and by the swinging movements of the truck.

8. In a locomotive engine, the combination of a main frame, driving wheels journaled in bearings therein, a radial truck pivoted to the main frame, springs through which weight borne by the main frame is transmitted to the frame of the truck, and rocking lever and link mechanism coupled to the main frame and exerting downward pressure on the truck springs in the swinging movements of the truck.

9. In a locomotive engine, the combination of a main frame, driving wheels journaled in bearings therein, a radial truck pivoted to the main frame, springs through which weight borne by the main frame is transmitted to the frame of the truck, frictional members interposed between said springs and the frame of the truck, and rocking lever and link mechanism coupled to the main frame and exerting downward pressure on said frictional members, through the truck springs, in the swinging movements of the truck.

10. In a locomotive engine, the combination of a main frame, driving wheels journaled in bearings therein, a radial truck pivoted to the main frame, springs through which weight borne by the main frame is transmitted to the frame of the truck, downwardly depending rocking levers pivoted to the main frame and having arms fitting over the truck springs, and connections coupling said links to the truck frame with the capacity of limited relative motion.

11. In a locomotive engine, the combination of a main frame, driving wheels journaled in bearings therein, a radial truck pivoted to the main frame, springs through which weight borne by the main frame is transmitted to the frame of the truck, downwardly depending rocking levers pivoted to the main frame and having arms fitting over the truck springs, links pivoted to the rear member of the truck frame and having longitudinal slots adjoining their outer ends, and pins engaging the slots of the links and coupling the rocking levers thereto.

FRANCIS J. COLE.
FRANK F. SCOVILLE.

Witnesses:
S. W. TYLER,
H. G. PHELPS.